United States Patent Office 3,234,173
Patented Feb. 8, 1966

3,234,173
STABILIZED RUBBER COMPOSITIONS
Roger H. Mann, Newport Beach, Calif., and Donald F. Hess, Marietta, Ohio, assignors to Shell Oil Company, New York, N.Y., a corporation of Delaware
No Drawing. Filed Oct. 15, 1962, Ser. No. 230,723
3 Claims. (Cl. 260—33.6)

This invention relates to the production of stabilized rubber compositions. More particularly, it is concerned with the product of rubber compositions showing improved aging characteristics and resistance to thermal degradation.

Monomeric hydrocarbons, particularly those containing terminal vinyl radicals, may be polymerized in hydrocarbon solvent or diluent media in the presence of certain catalysts to produce polymers having either resinous or elastomeric properties. Isoprene, for example, can be polymerized in this way to produce highly desirable polyisoprenes having a high cis-1,4 content. Similarly, ethylene and propylene polymerize to produce homopolymers or copolymers which are high in molecular weight and may have either rubbery or resinous properties depending in part upon the relative proportions of the monomers employed.

Several problems are associated with the production and recovery of polymeric hydrocarbons from their solutions including that of color and of thermal or oxidative stability. While oxidation stability can be substantially improved by the incorporation of suitable antioxidants this does not solve the instability problems which relate to the contamination of rubber with metallic ions.

A certain degree of improvement in the latter respect has been made by the incorporation of water soluble sequestering agents. The sequestering agents thus employed promote improved stability and color of the product but are not fully satisfactory in this respect. The recovered rubbers have been found to be still highly subject to degradation during the drying and storage steps following coagulation and continue to degrade after the finished rubber has been packaged or baled preparatory to its eventual end use.

Another problem associated with the use of water soluble chelating agents is that of the proper method for incorporation of the chelate in or together with the rubber. Attempts have been made to incorporate the chelating agent directly in the rubber cement. However, the chelates formerly employed for this purpose are water-soluble and consequently are not soluble in the hydrocarbon solvents necessary for solution of the ordinary hydrocarbon rubber polymers. In view of this, plugging difficulties have been encountered where the chelating agent has accumulated in lines associated with the transport of the rubber cements. Also, of course, the problem of complete and uniform dispersal of the water-soluble chelate in a hydrocarbon polymer has never been fully satisfactory. Even when so incorporated, the resulting rubbers still have shown unsatisfactory color stability and relatively poor color initially.

It is an object of the present invention to provide improved rubber compositions. It is a particular object of the invention to provide rubber compositions having improved thermal stability. It is a special object of the invention to provide an improved process for the production of rubbers from their cements. Other objects will become apparent during the following detailed description of the invention.

Now, in accordance with the present invention, improved rubber compositions are provided comprising a major proportion of hydrocarbon polymeric elastomers prepared from unsaturated hydrocarbons and containing 0.01–2 phr. of certain hydrocarbon soluble chelating agents having the general configuration

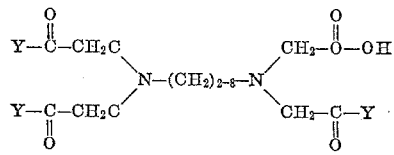

wherein each y is an independently selected radical of the group consisting of hydroxyl and $C_{12-20}$ alkylamino, at least one of which is alkylamino.

Still in accordance with the present invention, a process for the coagulation of rubber polymers is provided comprising forming a rubber cement and adding thereto at least one of the chelating agents defined above, forming an aqueous coagulating bath and adding thereto a water-soluble chelating agent, injecting the rubber cement into the coagulating bath under such circumstances that the solvent contained in the cement is removed by flashing and recovering the coagulated polymer containing the hydrocarbon soluble chelating agent. Under these circumstances, substantially none of the water-soluble chelating agents is incorporated in the rubber. The products so produced have initial high quality color and substantially improved thermal stability. Still further improvements are obtained by the incorporation in the rubber at any stage of its manufacture of a rubber antioxidant, preferably a phenolic compound.

The hydrocarbon soluble chelating agents have been found to stabilize the elastomer particularly as measured by its color stability and its intrinsic viscosity degradation over drying periods and subsequent storage periods. It has been found that the hydrocarbon soluble chelating agents are substantially better in this respect than are water-soluble chelating agents but that still further improvements are achieved in these respects by utilizing both the hydrocarbon soluble chelating agent incorporated in the cement and the water-soluble chelating agent dissolved in the coagulating bath.

The preferred class of compounds comprise the long chain amides of ethylene diamine tetra acetic acids, including especially those having from 14 to 18 carbon atoms per molecule in the amide radical. The hydrocarbyl radical forming the essential proportion of the amide may be either saturated or unsaturated. The saturated amides are more resistant to oxidation but the unsaturated amides are lower melting and more readily soluble in the hydrocarbon solvent and therefore are more amenable for use on a plant scale. Typical amides meeting the general configuration given here before are as follows:

*Hydrocarbon soluble amides*

Dioctadecenyl amide of ethylene diamine tetraacetic acid
Trioctadecenyl amide of ethylene diamine tetraacetic acid
Dioctadecyl amide of propylene (1,3) diamine tetraacetic acid
Dioctadecenyl amide of tetramethylene (1,4) tetraacetic acid
Octadecenyl octyl diamide of ethylene diamine tetraacetic acid The amides are preferably incorporated in the elastomers while they are in the form of a cement prior to coagulation. While they may be blended in the form of a melt or even incorporated by thorough mixing as solids, it is preferred to dissolve the amides in a solvent therefor and thereafter disperse the solution throughout the rubber cement. Preferred solvents for this purpose comprise particularly oil extending agents which are normal ingredients employed in rubber compositions. These oil extenders may comprise either naphthenic or aromatic extending oils which may be still further diluted if desired with relatively lower molecular weight hydrocarbon solvents such as butanes, hexane, or pentanes. The amides are utilized in an amount between about 0.01 and 2 phr., preferably between about 0.05 and 1 phr. This proportion will be determined by trial and error and will depend largely upon the specific elastomer being so stabilized, the identity of the particular hydrocarbon soluble amide and the conditions to which it will be subjected.

The aqueous coagulating bath normally comprises hot water maintained at or near the boiling point by the continuous or intermittent injection of steam. In the absence of any water-soluble chelating agent, it has been found that the usual processing waters and the commercially produced rubber cements contain sufficient heavy metals to cause a disadvantageous discoloration of the resulting rubber and to promote the thermal and oxidative degradation thereof. Prior procedures have involved the utilization of a water-soluble chelating agent to remove these metals. While this process has been somewhat successful, it has not entirely corrected the disadvantages which were noted, hence, the present invention involving the incorporation of a hydrocarbon chelating amide in the rubber cement was propounded.

The exact identity of the water-soluble chelating agent to be incorporated in the coagulating batch is not critical. However, the preferred type of chelating agents are those based on amino acetic acid but are of such a character that they are water-soluble and generally have the configuration.

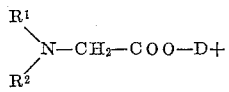

wherein $R^1$ is selected from the group consisting of —H; —CH$_2$COO—D+; and

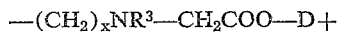

wherein $R^2$ and $R^3$ each are selected from the group consisting of —H; —CH$_2$COO—D+; and CH$_2$COOR$^4$ wherein $R^4$ is an alkyl radical having from two to five carbon atoms in the chain; wherein D is a cation selected from the group consisting of H+, Na+, K+, Li+, NH$_4$+, and NH+A$_3$; wherein A is at least one of the members of the group consisting of hydrogen, alkyl and ethanol; and wherein $x$ is at least 2 and not more than 4. The amount employed will depend in large part upon the metallic content of the rubber and water but usually will be 0.01–2 phr.

The preferred class of water-soluble chelating agents coming within the generic scope of these materials include particularly the alkali metal salts of ethylene diamine acetic acids, preferably the alkali metal salts of ethylene diamine tetra acetic acid. The sodium salts are readily available.

Typical water-soluble chelating agents coming within the general configuration given hereinabove, are as follows:

*Water-soluble chelating agents*

Amino acetic acid
Amino diacetic acid
Amino triacetic acid
Ethylene diamine diacetic acid
Ethylene diamine tetra acetic acid
Butylene diamine acetic acid
Mono-N-butyl amine salt of ethylene diamine tetra acetic acid as well as their alkali metal or ammonium salts such as tetra sodium salt of ethylene diamine tetra acetic acid While it is possible to incorporate the hydrocarbon soluble chelating agents in the rubber at any stage of its manufacture, it is convenient and often important to do this before the rubber has been subjected to any material exposure to atmospheric oxygen or heat. This involves the incorporation of the hydrocarbon soluble chelating amide while the rubber is in its polymerization medium, which is preferably a solvent. In other words, the preferred situation for the application of the hydrocarbon solvent chelating amide is to incorporate the amide in a cement resulting from a solution polymerization process. This is usually accomplished as stated hereinbefore by the additional injection of a known type of rubber antioxidant, preferably a substituted phenol. Still more preferably of course the injection of the amide and phenol in the rubber cement is made immediately prior to coagulation of the rubber in a coagulating bath, the latter preferably containing the above identified class of water soluble chelating agents. Elastomeric or resinous polymers considered within the scope of the present invention comprise those containing at least one terminal olefinic group and preferably comprise conjugated dienes having up to about 8 carbon atoms per molecule. These include ethylene propylene, copolymers of ethylene and propylene, polymers of open chain aliphatic conjugated dienes such as butadiene, isoprene, 2,3-dimethyl butadiene-1,3, 2-ethyl-pentadiene, or the like; the conjugated alicyclic polyolefinic hydrocarbons such as cyclopentadiene-1,3, cyclohexadiene-1,3, cycloheptadiene-1,3, dimethyl fulvene and others; the aryl-substituted diolefin hydrocarbons such as phenyl-butadiene-1,3, 2,3-diphenyl-butadiene-1,3, diphenyl fulvene and others; and mixtures of any two, three or more of such 1-monoolefins and/or conjugated polyolefins with or without non-conjugated polyolefins such as allene, diallyl, dimethallyl, propyl allene, squalene, 1-vinyl-cyclohexene-3, and others.

The preferred method of preparation of polymers which are to be treated in accordance with the present invention comprise solution polymerization with conjugated dienes such as isoprene. This constitutes polymerization with lithium alkyls while with conjugated dienes such as butadiene and the like, Ziegler catalysts are preferred, although lithium alkyl may be used for this purpose as well.

The elastomers used as the major components of the present invention are normally prepared by known synthetic methods, one of which comprises catalytic polymerization with a lithium based catalyst, while another depends upon the use of a Ziegler catalyst and certain modifications thereof. In the former method, the catalyst comprises lithium metal, an alkyl lithium or other lithium compounds as described in U.S. Patents 2,849,432; 2,856,391 and 2,913,444. All of these result in the formation of synthetic polyisoprenes having a cis 1,4-content in the order of 90–95%. Other lithium compounds include lithium hydrocarbyls, organo lithium amides, etc., but the alkyl lithium compounds are particularly preferred.

While isoprene having average intrinsic viscosities of 3–20 is the preferred conjugated diolefin to be used in the polymerization, it is possible to utilize equivalents thereof or mixtures of isoprene with other copolymerizable materials. Thus, butadiene, mixtures of isoprene and butadiene, and other $C_4$–$C_5$ conjugated diolefins may be employed. It is preferred however that either isoprene or butadiene predominate in the polymerization product and still more preferred is the product comprising essentially 100% of polyisoprene or 100% polybutadiene (the latter having an intrinsic viscosity of 1.5–8).

The elastomers may also be prepared by polymerization in the presence of a Ziegler type catalyst. The catalyst normally comprises the reaction product of a heavy metal compound with an aluminum compound, with or without a cobalt or nickel halide such as cobalt chloride. The heavy metal compound is that of a metal from Group IVB, VB or VIB of the Periodic Table, including titanium, zirconium, hafnium, vanadium, niobium, etc., but preferably titanium. Salts may be utilized for this purpose and the halides are most preferred. Titanium tetrachloride is the most preferred species.

The aluminum compound is preferably as aluminum alkyl or an aluminum alkyl halide. The heavy metal salt and the aluminum compound are normally employed in the mol ratios between about 0.5:1 and about 1.5:1. Polymerization is usually conducted at temperatures between about 0 and 80° C. for a period of time between about ½ and about 10 hours.

Polybutadiene may be prepared by known methods including catalysts such as cobaltous or nickelous halides combined with aluminum alkyl halides and water. Reaction media may include inert hydrocarbons such as monoolefins and/or aromatics (e.g., butene-1 and benzene). Reaction times may vary from 15 minutes to 8 hours at 0–100° C.

The rubber cements resulting from solution polymerization as described hereinbefore are modified with at least one of the hydrocarbon soluble amides and then subjected to a recovery step in an aqueous coagulation bath under such conditions that the solvent present is vaporized and the coagulated rubber recovered as a water-wet product. The coagulation bath is normally hot water optionally modified by steam injection. The precise conditions of coagulation are immaterial to the present invention but usually comprise injection of steam into the rubber cement just prior to contact of the latter with liquid water. The coagulated rubber is drained and dried to recover the crumb rubber.

The coagulating bath should contain preferably at least one of the water-soluble chelating agents referred to hereinabove.

It will be seen therefore that the rubber is subjected not only to high thermal influences, but also to oxidative influences, the deleterious effects of which are strongly counter-acted by the presence of the hydrocarbon soluble amide and still more so by the concurrent utilization of the water-soluble chelating agent and preferably also by a rubber antioxidant such as a hindered substituted phenol antioxidant.

Any of the known rubber anti-oxidants may be incorporated in rubber at any stage following polymerization. These include the usual aromatic amines (e.g., phenyl beta-naphthylamine), phenols and methylene bis phenols, preferably employed in an amount of 0.02–2 phr.

The following examples illustrate the advantages of the present invention: Isoprene was polymerized in the presence of a hydrocarbon solvent to form a polyisoprene cement. Portions of this cement were treated in four different ways to remove the solvent and recover the rubber: All samples were coagulated in an aqueous bath by injection of steam. The recovered rubber was then separated from drainable water. The rubber crumb was then subjected to air drying at a temperature of 175° F. for 60 minutes. All samples contained 0.8 phr., 2,6-di-tertiary butyl-4-methyl phenol as an antioxidant. Where used, the dioleyl amide of ethylenediaminetetraacetic acid was dissolved in a naphthenic rubber extending oil so as to provide the indicated amounts of amide in the rubber and 3 phr. of extending oil.

The samples tested are listed as follows:

| Sample | Water soluble chelating agent [a] | Hydrocarbon [b] soluble amide |
| --- | --- | --- |
| A | None | None. |
| B | 0.3 p.h.r. in cement | Do. |
| C | None | 0.1 p.h.r. in cement. |
| D | 0.1 p.h.r. in bath | Do. |

[a] tetra sodium salt of ethylenediamine tetra-acetic acid.
[b] dioleyl amide of ethylenediamine tetra-acetic acid.

The rubbers recovered after the indicated treatments were subjected to an accelerated aging test at 60° C., the intrinsic viscosity of the compositions being determined periodically. In the absence of any chelating agents (Sample A) the rubber degraded at a relatively rapid rate. When a water-soluble chelating agent only was employed (Sample B) the rate of degradation was somewhat slower but still was unsatisfactory. Use of the hydrocarbon soluble amide in only ⅓ of the amount relative to that of the water-soluble chelating agent (Sample C) caused a substantial improvement in the rate of viscosity degradation and still further improvement in this rate of degradation was achieved by utilizing both of these agents (Sample D).

We claim as our invention:

1. A process for the coagulation of a rubber from its cement wherein a hydrocarbon rubber cement is modified with a hydrocarbon soluble amide having the general configuration

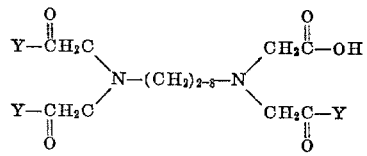

wherein each Y is an independently selected radical of the group consisting of hydroxyl and $C_{12-20}$ alkylamino, at least one Y being alkylamino, an aqueous coagulation bath is modified with a water soluble chelating agent having the general configuration

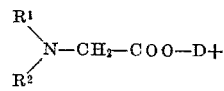

wherein $R^1$ is selected from the group consisting of —H; —$CH_2COO$—D+; and

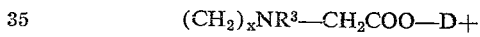

$$(CH_2)_x NR^3 - CH_2COO - D+$$

wherein $R^2$ and $R^3$ each are selected from the group consisting of —H; —$CH_2COO$—D+; and $CH_2COOR^4$ wherein $R^4$ is an alkyl radical having from two to five carbon atoms in the chain; wherein D is a cation selected from the group consisting of H+, Na+, K+, Li+, $NH_4+$, and NH+$A_3$; wherein A is at least one of the members of the group consisting of hydrogen, alkyl and ethanol; and wherein $x$ is at least 2 and not more than 4, the rubber cement is contacted with the bath at a temperature sufficient to flash the hydrocarbon solvent, whereby rubber containing 0.01–2 phr. of the amide is coagulated and separated from the bath and from the cement solvent.

2. A process according to claim 1 wherein the water soluble chelating agent is an alkali metal salt of an alkylene diamine acetic acid compound.

3. A process for the coagulation of polyisoprene rubber from its cement wherein polyisoprene dissolved in a hydrocarbon solvent is mixed with 0.05 phr. of a dioctadecenyl amide of ethylene diamine tetra acetic acid, a sodium salt of ethylene diamine tetra acetic acid is dissolved in a coagulation bath, the polyisoprene solution is contacted with the bath at a temperature sufficient to flash the hydrocarbon solvent and coagulated rubber containing the diamide is recovered therefrom.

References Cited by the Examiner
UNITED STATES PATENTS

| | | | |
| --- | --- | --- | --- |
| 2,683,139 | 7/1954 | Leary et al. | 260—94.2 |
| 2,805,203 | 9/1957 | Knapp et al. | 260—534 |
| 2,953,554 | 9/1960 | Miller et al. | 260—33.6 |
| 2,970,128 | 1/1961 | Csendes | 260—45.9 |

OTHER REFERENCES

Martell et al.: The Properties and Uses of Ethylenediamine Tetra Acetic Acid and its Salts; Bersworth Chemical Co., 1949; pages 7 and 11.

MORRIS LIEBMAN, *Primary Examiner.*

L. T. JACOBS, *Assistant Examiner.*